J. K. SIMPSON.
Electrical-Torches.
No. 6,167. Reissued Dec. 8, 1874.
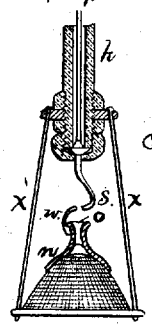
Fig. 3.
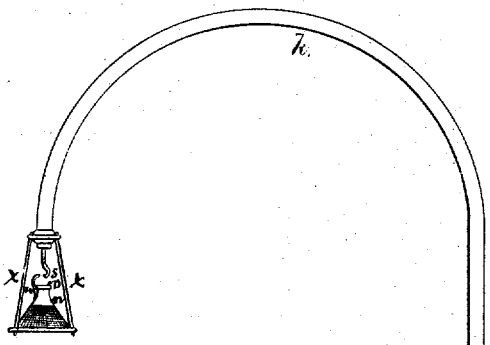
Fig. 1.
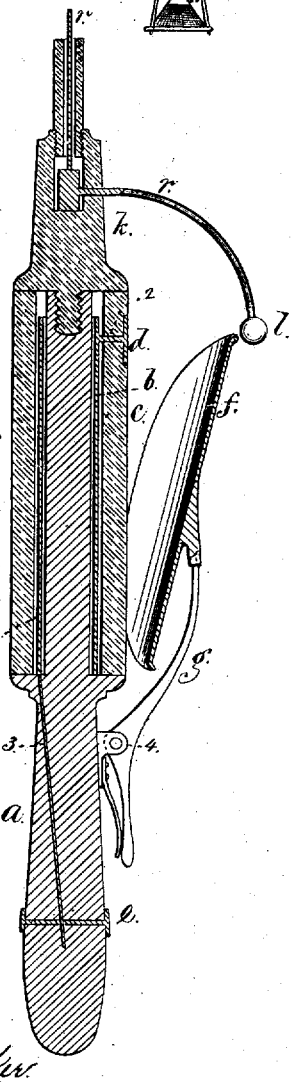
Fig. 2.
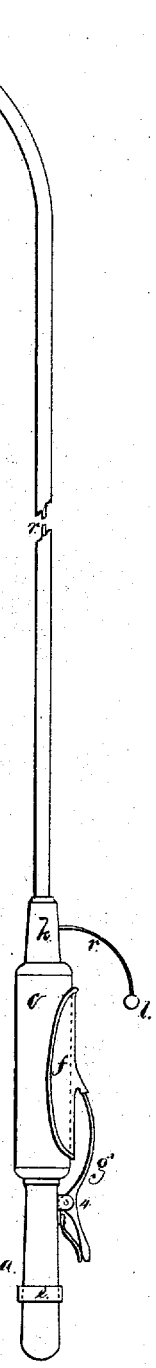
Witnesses.
Geo. D. Walker.
Geo. T. Pinckney
John K. Simpson
per Lemuel W. Serrell
THE NORRIS PETERS CO., PHOTO-LITHO., WASHINGTON, D. C.

UNITED STATES PATENT OFFICE.

JOHN K. SIMPSON, OF NEWARK, NEW JERSEY, ASSIGNOR, BY MESNE ASSIGNMENTS, TO HENRY MANDEVILLE.

IMPROVEMENT IN ELECTRICAL TORCHES.

Specification forming part of Letters Patent No. 69,715, dated October 8, 1867; reissue No 6,167, dated December 8, 1874; application filed October 16, 1874.

*To all whom it may concern:*

Be it known that I, JOHN K. SIMPSON, of Newark, Essex county, in the State of New Jersey, (formerly of New York, N. Y.,) have invented an Improvement in Electrical Torches, of which the following is a specification:

Electricity has been employed in lighting gas before my invention. In some instances the spark-points were affixed to the burners, and an electrical instrument brought into contact with the insulated conductor. In other instances there has been a device connected to the burner containing the spark-points, and an opening through which the gas passed as it was ignited by the spark.

My invention consists in a portable torch made by combining in one instrument an electrophorus, or other source of electricity, spark-points, and a gas-directing device that is made with an opening to pass the gas to the spark-points, and insure the ignition of the gas.

In the drawing, Figure 1 is an elevation of the torch. Fig. 2 is a section, in about full size, of the electrophorus; and Fig. 3 is a section of the torch end.

The handle *a* receives around it the metal tube *b*, and this is surrounded by the tube *c* of hard rubber. The small metal plate *d*, let into the surface of *c*, is connected by the metal pin 2 with the tube *b*. The rod 3 from *b* passes to the metal ring *e*. The cylindrical segment *f*, of metal or wood, lined with foil, fits the surface of the tube *c*, and it is mounted upon a lever, *g*, that is pivoted at 4, and provided with a thumb-piece at the end, and a spring to keep the segment *f* in contact with *c*, except when the lever *g* is pressed upon.

By this construction the electrophorus is in contact with the person through the ring *e*, and the same will be operative to produce the required electrical spark by raising the plate *f* from the surface of *c* after the electrophorus has been well dried by wiping the same with a piece of silk or other material.

The stem *k* reaches from the handle *a* to the torch. I have shown the same as a tube of non-conducting material containing the wire *r*, that reaches to the ball *l* at one end and the spark-point *s* at the other end, and the stem *k* is preferably bent over at the end, as shown, so as to allow the spark-points to be brought above the gas-jet.

The end of the stem is provided with a gas-directing device, *n*, which is shown in the form of a hollow cone, having an opening, *o*, contiguous to the spark-point *s*. To its base is attached a wire-gauze cone, both being supported by and attached to the end of the stem *k* by means of rods *x*.

The operation of the torch is as follows: The gas having been turned on the fixed burner which it is intended to light, and the plate *f* raised from tube *c* into contact with the ball *l*, the spark will pass from the point *s* to the director, which is held over the fixed burner, and thus causes the ignition of the gas as it passes up through the director. A portion of the gas will in such operation escape through the side of the wire-gauze cone.

This electrical torch is complete in itself, and is operative with any gas-burner, and the burner itself does not require to be changed, or any appliance provided for the burner itself, and the torch can be operated by one hand, the electrophorus being contiguous to the handle of the torch.

I claim as my invention—

1. The electrical torch made by the combination, in one implement, of a gas-director, spark-point, and an electrophorus, or other portable electrical device, substantially as set forth.

2. The portable torch provided with an electrophorus contiguous to the handle, and operated by a thumb or finger piece, substantially as set forth.

3. The herein-described electrophorus, consisting of the hard-rubber tube *c*, the metallic plate *f*, and the metallic tube *b*, connected, through the plate *d* and rod 2, with the outer surface of the rubber tube *c*, and through the rod 3 and ring *e*, or its equivalent, with the outer surface of the handle *a*, substantially as set forth.

4. The torch with a gas-director insulated from the point *s*, substantially as and for the purposes described.

5. The combination of an electrophorus, situated near the lower end of a torch, the gas-director *n*, at the upper end of said torch, and a conductor between the electrophorus and the gas-director, so arranged as to convey the electricity from the electrophorus to the insulated point *s*, contiguous to the opening of the gas-director, substantially in the manner and for the purposes set forth.

Signed by me this 15th day of October, A. D. 1874.

JOHN K. SIMPSON.

Witnesses:

JOS. M. SLATER,

PETER K. EDGAR.